United States Patent [19]
Kohn

[11] Patent Number: 5,777,764
[45] Date of Patent: Jul. 7, 1998

[54] TRANSMISSION STATION, INTERMEDIATE REPEATER AND RECEIVER STATION FOR A FIBRE-OPTIC COMMUNICATIONS-TRANSMISSION SYSTEM

[75] Inventor: Ulrich Kohn, Backnang, Germany

[73] Assignee: Robert Bosch GmbH, Stuttgart, Germany

[21] Appl. No.: 615,328
[22] PCT Filed: Sep. 15, 1994
[86] PCT No.: PCT/DE94/01065
  § 371 Date: Mar. 13, 1996
  § 102(e) Date: Mar. 13, 1996
[87] PCT Pub. No.: WO95/09492
  PCT Pub. Date: Apr. 6, 1995

[30] Foreign Application Priority Data

Sep. 30, 1993 [DE] Germany .................. 43 33 367.2

[51] Int. Cl.⁶ .................. H04J 14/02; H04B 10/16
[52] U.S. Cl. .................. 359/133; 359/115; 359/177; 359/181
[58] Field of Search .................. 359/133, 174, 359/177, 179, 180, 181, 188, 189, 193, 124, 115

[56] References Cited

U.S. PATENT DOCUMENTS 4,824,201 4/1989 Kazovsky .................. 359/133

FOREIGN PATENT DOCUMENTS

| 0440276 | 1/1991 | European Pat. Off. . |
|---|---|---|
| 0450524 | 3/1991 | European Pat. Off. . |
| 0504777 | 3/1992 | European Pat. Off. . |
| 3506715 | 2/1985 | Germany . |
| 2257230 | 6/1992 | United Kingdom . |

OTHER PUBLICATIONS

P.M.Gabla, J.Q.Frorud,E.Leclerc,S.Gauchard and V.Havard, IEEE Photonics Technology Letters, vol. 4, No. 7, Jul. 1992, New York US, pp. 717–720.

IEEE Global Telecommunications Conference&Exhibition, GLOBECOM '90, S.Matsuoka, et al, vol. 3, 2 Dec. 1990, San Diego, US, pp. 1846–1850.

Primary Examiner—Leslie Pascal
Attorney, Agent, or Firm—Michael Striker

[57] ABSTRACT

The invention relates to a transmitting station (SS), and intermediate repeater (ZV1 to ZVn) and a receiving station (ES) for an optical communications-transmitting system for transmitting useful data of a high bit rate by means of at least one optically narrow-band carrier signal, and for transmitting additional data, for example service information, of a low bit rate. In order to operate the communications-transmitting system with the lowest possible outlay, an optically wide-band carrier signal, for example from a super-luminescence diode, which is located in the wavelength range of the narrow-band optical carrier signal, is used for transmitting the additional data. Both the optically narrow-band carrier signal of the useful data and the optically wide-band carrier signal of the additional data are located within the amplifying range of an optical fiber amplifier disposed in the intermediate repeater (ZV1 to ZVn). Both carrier signals can be selected with simple means.

11 Claims, 3 Drawing Sheets

TRANSMISSION STATION, INTERMEDIATE REPEATER AND RECEIVER STATION FOR A FIBRE-OPTIC COMMUNICATIONS-TRANSMISSION SYSTEM

BACKGROUND OF THE INVENTION

The instant invention relates to a transmitting station, an intermediate repeater and a receiving station for an optical communications-transmitting system with at least one intermediate repeater for transmitting useful data of a high bit rate by means of at least one optical narrow-band carrier signal and for transmitting additional data of a low bit rate.

An arrangement of this type is known from EP 440 276 A2, for example. An optical waveguide transmission system is disclosed there, wherein the useful data of a high bit rate and additional data of a low bit rate for service purposes are transmitted in one direction in an optical waveguide. The useful data of a high bit rate are transmitted at a data rate of several 100 MBit/sec, for example, in the wavelength range between 1500 and 1600 nm. This wavelength range corresponds to the so-called third optical window of the optical waveguide in which optical damping is at a minimum. The additional data are transmitted, for example at a data rate of some 100 kBit/sec, in a wavelength range around 1300 nm. This is the so-called second optical window of the optical waveguide.

This transmitting system utilizes intermediate repeaters with optical fiber amplifiers for the wavelength range between approximately 1500 to 1600 nm in order to compensate the damping losses in the glass fiber. The additional data are uncoupled by means of a wavelength multiplexer upstream of the fiber amplifiers, are subsequently detected, electrically processed, electro-optically converted and again coupled into the glass fiber downstream of the fiber amplifier.

Processing of the additional data in the intermediate repeaters requires a relatively large technical outlay.

A method for optical communication transmission is disclosed in DE 35 06 715 A1, by means of which data are transmitted in the opposite direction via an optical waveguide. Data of a high bit rate are transmitted in the one direction by means of an optically narrow-band carrier signal, for example a semiconductor laser, while data of a low bit rate are transmitted in the opposite direction by means of an optically wide band carrier signal, for example a luminescence diode (LED). The wavelengths of the narrow band and wide band carrier signals are located in an area with little dispersion of the optical waveguide.

SUMMARY OF THE INVENTION

It is the object of the invention to recite a transmitting station, an intermediate repeater and a receiving station for a communications-transmitting system of the type mentioned at the outset, which can be realized with the lowest possible outlay.

This object is attained in by a transmitting station for an optical communications-transmitting system with at least one intermediate repeater, which contains a first transmitter for transmitting useful data of a high bit rate by means of at least one optically narrow-band carrier signal, and a second transmitter for transmitting additional data of a low bit rate, wherein the useful data and the additional data are transmitted in the same direction, wherein in accordance with the invention the second transmitter is designed in such a way that the additional data of a low bit rate are transmitted over at least one optical wide-band carrier signal, and that the narrow-band and the wide-band carrier signals are located in the same wavelength range.

Besides useful data of a high bit rate and an optically narrow-band carrier signal, it is possible by means of the transmitting station, the intermediate repeater and the receiving station to transmit additional data of a low bit rate, for example for service purposes, within the amplifying bandwidth of an optical fiber amplifier. This is made possible by means of a wide-band optical carrier signal, whose spectral intensity is low in comparison to the optical narrow-band carrier signal of the useful data. Therefore the narrow-band and the wide-band carrier signals can be amplified together by means of the optical fiber amplifier. The service data required for operating the fiber amplifier, which are contained in the additional data, can be coupled into and out of the optical wave transmission path with the help of a simple optical coupler which need not be wavelength-selective.

The optically wide-band carrier signal can be generated in a transmitter by a super-luminescence diode, for example. The additional data modulated on this signal can be separated in a receiver, for example by means of a simple low-pass filter, from the high-frequency spectrum portions of the narrow-band optical carrier signal.

An optical filter is sufficient to separate the narrow-band from the wide-band carrier signal.

The transmitting station, the intermediate repeater and the receiving station are also suited for optical communications-transmitting systems which utilize several transmission channels with several optically narrow-band carrier signals. There is the option here of either assigning an optically wide-band signal with additional data to each transmission channel, or to provide one optically wide-band signal with additional data for all transmission channels.

BRIEF DESCRIPTION OF THE DRAWINGS

Exemplary embodiments of the invention are represented in the schematic drawings and will be explained in what follows. Shown are in.

DESCRIPTION OF PREFERRED EMBODIMENTS

Figure 1:
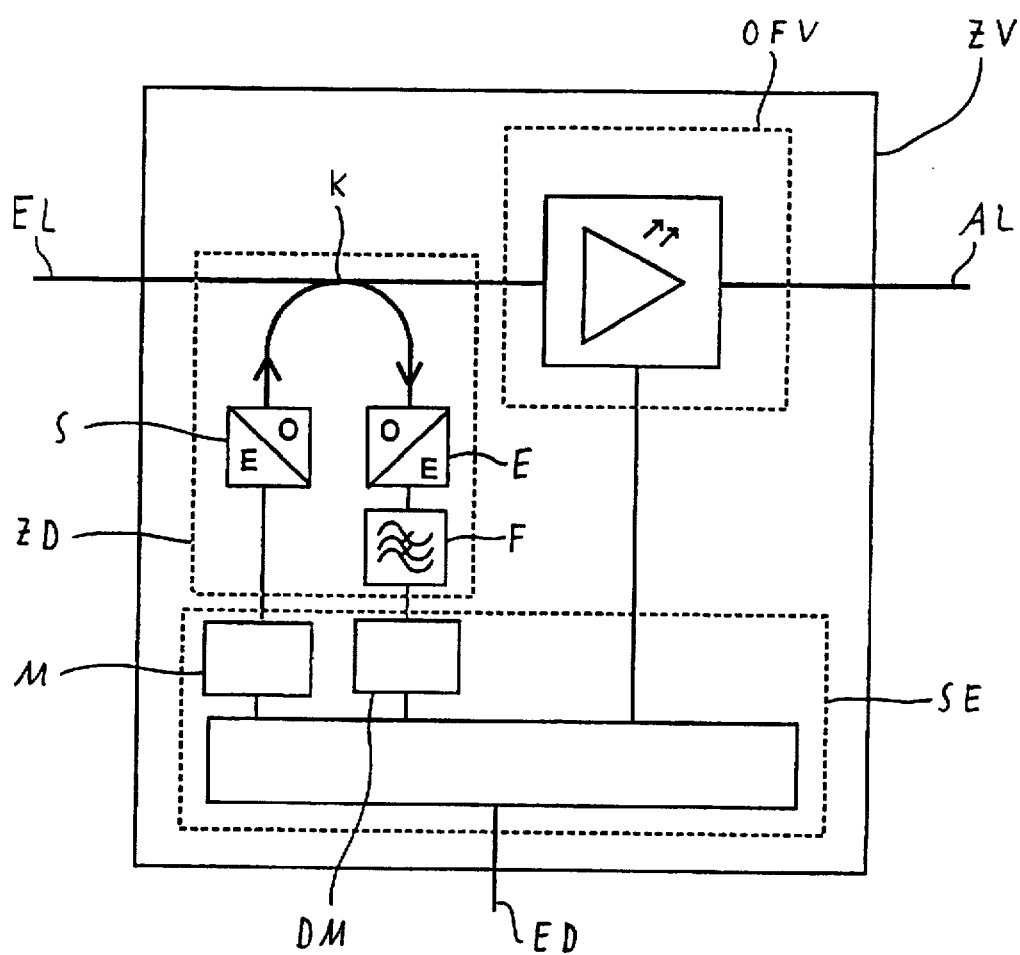
FIG. 1, an intermediate repeater of an optical waveguide transmission path containing a transmitter and a receiver for transmitting additional data of a low bit rate, FIG. 2, the optical intensity as a function of the wavelength of a superposition of one wide-band and three narrow-band carrier signals, FIG. 3, an optical communications-transmitting system with an optically narrow-band carrier signal and containing transmitters and receivers for transmitting additional data of a low bit rate, FIG. 4, several transmitting stations of a multi-channel transmitting system which each contain a transmitter for transmitting additional data of a low bit rate, and FIG. 5, a transmitting station of a multi-channel transmission system containing a transmitter for transmitting additional data of a low bit rate.

An intermediate repeater ZV of an optical communications-transmission system with an optical waveguide EL on the input side and an optical waveguide AL on the output side is represented in FIG. 1. An optical fiber amplifier OFV amplifies the optical signals of the communications-transmitting system in a purely optical manner, without an electro-optical conversion, for example within a wavelength range between 1500 and 1660 nm, an optical window of the optical waveguide. The amplification bandwidth of the optical fiber amplifier OFV is of an order of magnitude of 50 nm.

Optically narrow-band carrier signals must be employed for transmitting data of a high bit rate, for example bit rates above GBit/s. Transmitters usable for this are for example semiconductor lasers, such as DFB (distributed feedback)-lasers with line widths of less than 1 nm.

The intermediate repeater ZV contains an arrangement ZD, which is coupled by means of an optical coupler K with the optical waveguide EL on the input side, for transmitting and receiving a carrier signal with additional data of a low bit rate. These data are used for monitoring and service purposes, for example. The arrangement ZD contains a transmitter S and a receiver E, in which the additional data are electro-optically converted. The transmitter S utilizes a wide-band optical source, for example a super-luminescence diode, whose line width is approximately 50 nm. Additional data can be transmitted by means of this optical source at a bit rate of 64 kHz or several 100 kHz, for example. The optically broad-band carrier signals are transmitted in one direction in the optical waveguides EL and AL.

The wavelength of the carrier signal emitted by the transmitter S lies in the same wavelength range as the optically narrow-band carrier signal. It is possible by means of this step to utilize the optical fiber amplifier OFV for amplifying the optically wide-band carrier signal as well. Furthermore, the carrier signal of the additional data does not limit a wavelength range which might possibly be used otherwise.

Figure 2:
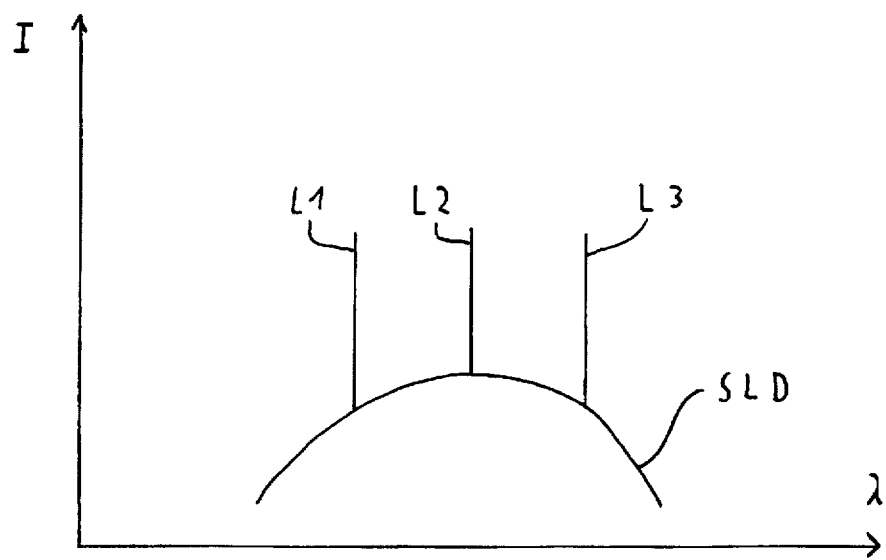

The intensity of a carrier signal emitted by the laser is considerably greater than that of a super-luminescence diode in respect to the overlapping wavelength ranges. This is explained in the diagram in FIG. 2. Here, the intensity I is plotted over the wavelength lambda. L1, L2 and L3 identify optically narrow-band carrier signals such as are emitted by lasers. The curve SLD shows the spectral intensity of the light radiated by a wide-band super-luminescence diode in a simplified manner.

The signals L1, L2 and L3 can be selected by means of an optically narrow-band filter in a receiver. Downstream of this filter the wide-band carrier signal only appears as a small noise portion on the narrow-band carrier signal.

The optically wide-band carrier signal is opto-electrically converted in a receiver E (FIG. 1). The data of a low bit rate can now be separated with the aid of a filter F, for example a low-pass filter, from the high-frequency spectral portion of a laser signal modulated with a high bit rate. The receiver E can also be embodied such that it only opto-electrically converts electrical signals of low frequency. In that case the filter F is not required.

A simple coupler which is not wavelength-selective is sufficient as the coupler K, which couples a portion of the light out of the optical waveguide EL for the receiver E and couples in the optical signal of the transmitter S. The coupler K is designed in such a way that the optical carrier signal of the transmitter S is not sensed by the sensitive receiver E.

The arrangement ZD can also be disposed in the intermediate repeater ZV downstream of the fiber amplifier OFV. In that case the optically wide-band signal conducted in the optical waveguide EL is amplified in the fiber amplifier OFV before it reaches the receiver E via the coupler K.

The intermediate repeater ZV has a control unit SE for operating the optical fiber amplifier OFV. It contains a modulator M, which is connected with the transmitter S, and a demodulator DM, which demodulates the output signal of the filter F. The additional data can contain telemetry data from the control unit SE, or data from an external interface ED, for example a telephone connection.

Figure 3:
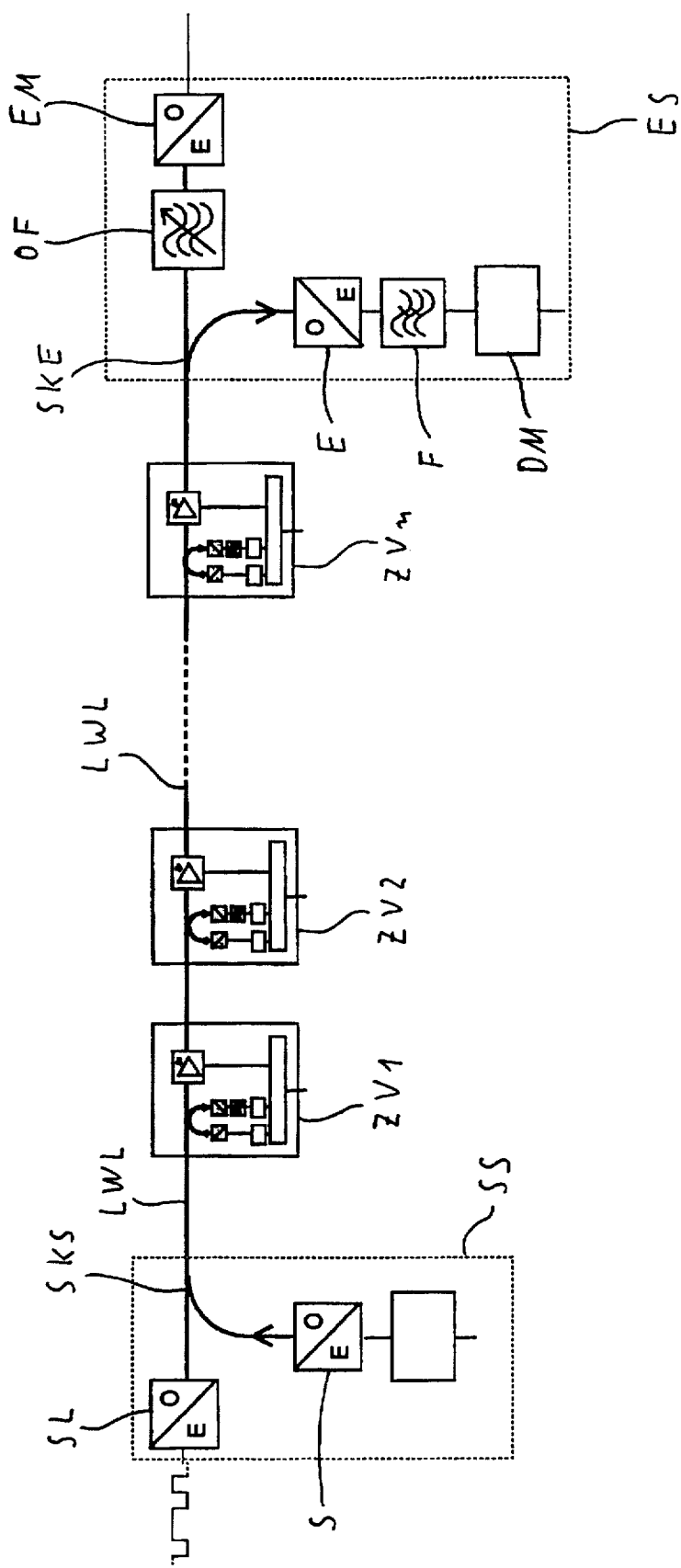

An optical communications-transmitting system with a transmitting station SS, a receiving station ES, an optical waveguide connection LWL and optical intermediate repeaters ZV1, ZV2, . . . ZVn is represented in FIG. 3. Data of a high bit rate are modulated on an optically narrow-band carrier signal in a transmitting arrangement SL, a first transmitter of the transmitting station SS. In addition, the transmitting station SS contains a second transmitter S for transmitting additional data of a low bit rate by means of an optically wide-band carrier signal. Its optical signal is coupled into the optical waveguide connections LWL by means of a coupler SKS. Damping of the optical waveguide connection LWL is compensated by means of the optical intermediate repeaters ZV1 to ZVn.

A portion of the optical input signal is coupled out in a coupler SKE in the receiving station ES for detecting the additional data of a low bit rate. They are extracted from the optical signal by means of a receiver E, Filter F and demodulator DM, as described above in connection with the intermediate amplifier ZV in FIG. 1.

The useful signal is filtered by means of a narrow-band optical filter OF in the receiving station ES in order to suppress the wide-band carrier signal, and is electro-optically converted in the receiver EM.

The optical communications-transmitting system can also be expanded into systems with several useful channels, each one with an optically narrow-band carrier signal for transmitting data of a high bit rate. In this case the narrow-band carrier signals must be located within the usable amplification range of the optical fiber amplifier. Systems, such as WDM systems (wavelength division multiplex) or CMC systems (coherent multi-channel), are usable.

Figure 4:
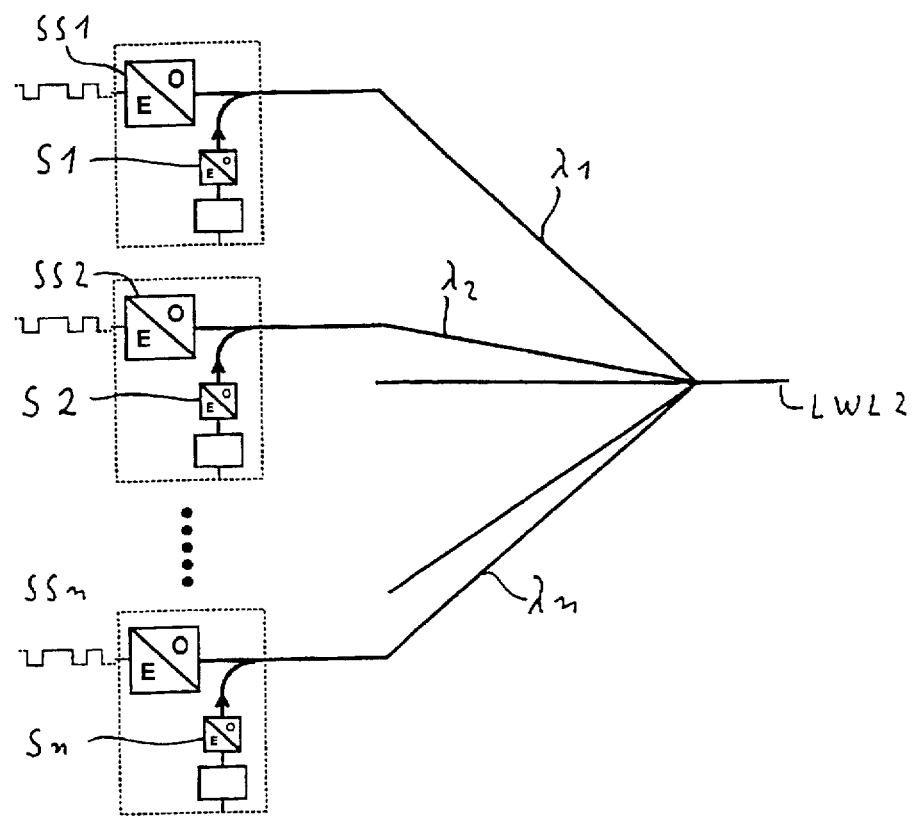

The transmitting side of a WDM system with n usable channels is represented in FIG. 4. Each usable channel contains data of a high bit rate, which are modulated on an optical narrow-band carrier signal of a defined wave length lambda 1, lambda 2, . . . lambda n in a transmitting station SS1, SS2, . . . SSn. These narrow band carrier signals are combined by means of a coupler and transmitted via an optical waveguide LWL2.

Each transmitting station SS1, . . . SSn contains a transmitter S1, S2, . . . Sn for transmitting additional data of a low bit rate via an optically wide-band carrier signal. For receiving, the individual transmitting station SS1 to SSn are independent of each other in this WDM system.

Figure 5:
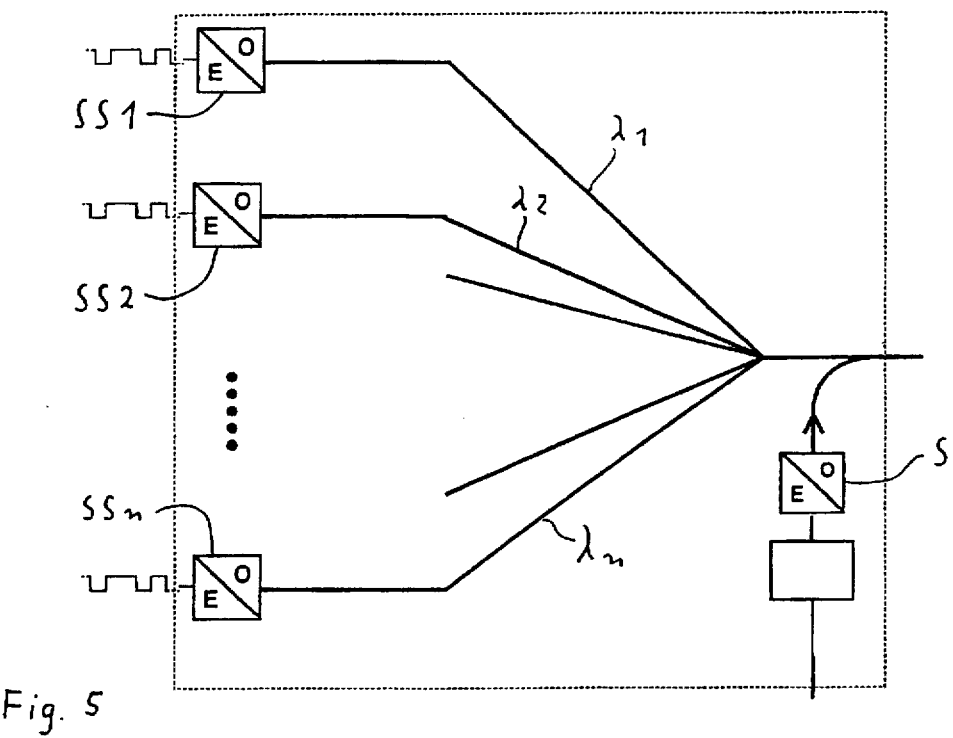

In the WDM system in FIG. 5, n transmitting units SS1 to SSn are arranged combined. In this case one transmitter S is sufficient for transmitting the additional data. For receiving the additional data, the receiving stations and the intermediate repeaters of these WDM systems are equipped with the appropriate receivers as described above.

I claim:

1. A transmitting station for an optical communications-transmitting system with at least one intermediate repeater, which contains a first transmitter for transmitting useful data of a high bit rate by means of at least one optically narrow-band carrier signal, and a second transmitter for transmitting additional data of a low bit rate, wherein the useful data and the additional data are transmitted in the same direction, characterized in that the second transmitter (S) is designed in such a way that the additional data of a low bit rate are transmitted over at least one optical wide-band carrier signal, and that the narrow-band and the wide-band carrier signals are located in the same wavelength range.

2. A transmitting station in accordance with claim 1, characterized in that the intensity per wavelength of the optically wide-band carrier signal is less than that of the optically narrow-band carrier signal.

3. A transmitting station in accordance with claim 1 characterized in that the wavelength ranges of the optically narrow-band and the optically wide-band carrier signals overlap.

4. A transmitting station in accordance with claim 1 characterized in that the optically narrow-band and the optically wide-band carrier signals are located within the amplification bandwidth of an optical fiber amplifier (OFV).

5. An intermediate repeater for an optical communications-transmitting system for transmitting useful data of a high bit rate by means of an optically narrow-band carrier signal and for transmitting additional data of a low bit rate, containing a transmitter for the transmission of additional data, whose optical carrier signal has the same direction as that of the optically narrow-band carrier signal, characterized in that the transmitter (S) is designed in such a way that the additional data of a low bit rate are transmitted via at least one optically wide-band carrier signal, and that the narrow-band and the wide-band carrier signals are located in the same wavelength range.

6. An intermediate repeater in accordance with claim 5, characterized in that the wavelength ranges of the optically narrow-band and the optically wide-band carrier signals overlap.

7. An intermediate repeater in accordance with claim 5 characterized in that the optically narrow-band and the optically wide-band carrier signals are located within the amplification bandwidth of an optical fiber amplifier (OFV).

8. An intermediate repeater in accordance with claim 5 characterized in that at the output of the intermediate repeater (ZV) the intensity per wavelength of the optically wide-band carrier signal is less than that of the optically narrow-band carrier signal.

9. A receiving station for an optical communications-transmitting system with at least one intermediate repeater, wherein the receiving station contains a first receiver for receiving the useful data of a high bit rate which are transmitted by means of an optically narrow-band carrier signal, and a second receiver for receiving additional data of a low bit rate which are transmitted by means of a second optical carrier signal, characterized in that the first receiver (EM) contains means for detecting the narrow-band carrier signal located in the same wavelength range as the carrier signal of the additional data, which is optically wide-band, and that the second receiver (E) contains means for detecting the optically wide-band carrier signal.

10. A receiving station in accordance with claim 9, characterized in that an optical coupler (SKE) which couples out a portion of the received signal, an optical receiver (E) and a filter (F), which filters out the high-frequency spectrum portions of the optically narrow-band carrier signal, are disposed in the receiving station for detecting the optically wide-band carrier signal.

11. A receiving station in accordance with one of claims 9 characterized in that a narrow-band optical filter (OF) for detecting the optically narrow-band signal is disposed in it, whose transmission band only includes the optically narrow-band carrier signal.

* * * * *